US012676384B2

(12) United States Patent
Song et al.

(10) Patent No.:  US 12,676,384 B2
(45) Date of Patent:      Jul. 7, 2026

(54) INTERNAL SERIES BATTERY AND ELECTRICAL DEVICE

(71) Applicant: CONTEMPORARY AMPEREX TECHNOLOGY (HONG KONG) LIMITED, Hong Kong (CN)

(72) Inventors: Peidong Song, Ningde (CN); Lili Wu, Ningde (CN); Xin Sun, Ningde (CN); Liang Yun, Ningde (CN); Xuan Li, Ningde (CN); Miaomiao Dong, Ningde (CN); Xingbu Chen, Ningde (CN); Rundie Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/948,671

(22) Filed: Nov. 15, 2024

(65) Prior Publication Data

US 2025/0070390 A1     Feb. 27, 2025

Related U.S. Application Data

(63) Continuation of application No. PCT/CN2022/125328, filed on Oct. 14, 2022.

(51) Int. Cl.
H01M 10/054 (2010.01)
H01M 10/0525 (2010.01)
(Continued)

(52) U.S. Cl.
CPC ....... H01M 50/46 (2021.01); H01M 10/0525 (2013.01); H01M 10/054 (2013.01); (Continued)

(58) Field of Classification Search
CPC ........... H01M 10/0565; H01M 10/052; H01M 10/0525; H01M 10/054; H01M 10/281; (Continued)

(56) References Cited

U.S. PATENT DOCUMENTS 6,878,491 B1 *   4/2005   Miura ................. H01M 10/052
                                                                    429/312
10,763,550 B2    9/2020   Hasegawa et al.
(Continued)

FOREIGN PATENT DOCUMENTS

CN          102027617 A      4/2011
CN          108695548 A      10/2018
(Continued)

OTHER PUBLICATIONS

International Search Report for PCT/CN2022/125328 mailed Jul. 8, 2023.
(Continued)

*Primary Examiner* — Jeremiah R Smith
(74) *Attorney, Agent, or Firm* — K&L Gates LLP

(57)                    ABSTRACT

This application provides an internal series battery, including a series module including three or more battery units, each including a positive active material layer, a solid electrolyte layer and a negative active material layer stacked, and intermediate current collectors, each disposed between the corresponding two adjacent battery units connected in series therethrough; a positive current collector located at one end of the series module and electrically connected to the positive active material layer of the battery unit at the end; and a negative current collector located at the other end of the series module and electrically connected to the negative active material layer of the battery unit at the end. The battery units include a first battery unit and a second battery unit that have an energy density the same as and (Continued)

different from any one of the battery units at the two ends of the series module respectively.

9 Claims, 2 Drawing Sheets

(51) Int. Cl.

| | |
|---|---|
| *H01M 10/056* | (2010.01) |
| *H01M 10/42* | (2006.01) |
| *H01M 50/446* | (2021.01) |
| *H01M 50/46* | (2021.01) |
| *H01M 50/528* | (2021.01) |

(52) U.S. Cl.
CPC ..... *H01M 10/056* (2013.01); *H01M 10/4235* (2013.01); *H01M 50/446* (2021.01); *H01M 50/528* (2021.01); *H01M 2220/20* (2013.01); *H01M 2300/0065* (2013.01); *H01M 2300/0091* (2013.01)

(58) Field of Classification Search
CPC ............. H01M 10/282; H01M 50/051; H01M 50/528; H01M 2300/0065–0082
See application file for complete search history.

(56) References Cited

U.S. PATENT DOCUMENTS

| | | | |
|---|---|---|---|
| 2015/0188188 | A1 | 7/2015 | Zhang et al. |
| 2016/0046195 | A1* | 2/2016 | Jang ........................ B60L 58/21 |
| | | | 320/103 |
| 2018/0287209 | A1* | 10/2018 | Hasegawa ......... H01M 10/0413 |
| 2020/0328452 | A1 | 10/2020 | Shimizu et al. |
| 2021/0300206 | A1* | 9/2021 | Martinsson ........... H02J 7/0019 |
| 2023/0307720 | A1* | 9/2023 | Liu ................... H01M 10/4207 |
| 2024/0128466 | A1* | 4/2024 | Kaneyama ........... H01M 4/667 |
| 2024/0170753 | A1* | 5/2024 | Shaffer, II ............... H01M 4/56 |
| 2024/0274860 | A1* | 8/2024 | Honda ............... H01M 50/209 |

FOREIGN PATENT DOCUMENTS

| | | |
|---|---|---|
| CN | 113921820 A | 1/2022 |
| CN | 114284548 A | 4/2022 |
| CN | 217035901 U | 7/2022 |
| CN | 114982011 A | 8/2022 |
| WO | 2020059550 A1 | 3/2020 |

OTHER PUBLICATIONS

Written Opinion for PCT/CN2022/125328 mailed Jul. 8, 2023.
Extended European Search Report dated Jul. 2, 2025 for application EP 22961779.0.

* cited by examiner

INTERNAL SERIES BATTERY AND ELECTRICAL DEVICE

CROSS-REFERENCE TO RELATED APPLICATIONS

This application is a continuation of International application PCT/CN2022/125328 filed on Oct. 14, 2022, the subject matter of which is incorporated herein in its entirety.

TECHNICAL FIELD

This application relates to the field of secondary batteries, and in particular, to an internal series battery and an electrical device.

BACKGROUND

With rapid development of electric vehicles, energy storage systems, etc., requirements for an energy density and a power density of a secondary battery in the market are getting higher and higher. In a conventional technology, a plurality of secondary batteries are typically connected in series to meet demands of increasing the energy density and the power density. However, series connection of the plurality of secondary batteries leads to a high risk of thermal runaway and has a high requirement for mechanical safety of the batteries; and it is difficult for the conventional series batteries to meet demands of both the energy density and safety performance.

SUMMARY

In view of the foregoing problems, this application provides an internal series battery having both a high energy density and good safety performance, and an electrical device.

One aspect of this application provides an internal series battery. The internal series battery includes:

a series module, including battery units and intermediate current collectors; the number of the battery units being greater than or equal to 3, each of the battery units including a positive active material layer, a solid electrolyte layer, and a negative active material layer that are stacked; and each of the intermediate current collectors being disposed between the corresponding two adjacent battery units, and the two adjacent battery units being connected in series through the intermediate current collector;

a positive current collector, located at one end of the series module and electrically connected to the positive active material layer of the battery unit at the end; and a negative current collector, located at the other end of the series module and electrically connected to the negative active material layer of the battery unit at the end, wherein the battery units include a first battery unit and a second battery unit; an energy density of the first battery unit is the same as an energy density of any one of the battery units at two ends of the series module; and an energy density of the second battery unit is different from energy densities of the battery units at the two ends of the series module.

In the internal series battery according to an implementation of this application, the battery units are connected in series through the intermediate current collectors. Through reasonable design of the first battery unit and the second battery unit with different energy densities, the internal series battery has both a high energy density and good safety performance.

In some embodiments, a ratio of the number of the second battery unit to the total number of the battery units is (1-2):3. The number of the second battery unit is within the foregoing range, so that the energy density and safety performance of the internal series battery may be reasonably adjusted, and the internal series battery has good comprehensive performance.

In some embodiments, the energy density of the first battery unit is greater than the energy density of the second battery unit. Typically, a battery system with a large energy density has relatively poor thermal stability and a large risk of thermal failure. The energy density of the first battery unit is greater than the energy density of the second battery unit, which is advantageous to exertion of a theoretical energy density of the internal series battery, and the internal series battery has a high energy density, good dynamic performance, and good thermal stability.

In some embodiments, an energy density of a negative active material of the first battery unit is greater than an energy density of a negative active material of the second battery unit. A negative active material with a large energy density typically has average thermal stability, while a negative active material with an average energy density typically has good thermal stability. Through reasonable selection and design of the negative active materials of the battery units, the internal series battery has both a high energy density and good thermal stability.

Optionally, the negative active material of each first battery unit independently includes at least one of a silicon-based material, a tin-based material, and a lithium metal; and the foregoing negative active material has a high theoretical energy density, but has average material thermal stability, the first battery unit uses the foregoing negative active material, and the battery units at the two ends of the series module have high energy densities, so that the internal series battery can have thermal stability while improving the energy density.

Optionally, the negative active material of each second battery unit independently includes at least one of artificial graphite, natural graphite, soft carbon, hard carbon, and lithium titanium oxide. The foregoing negative active material has an average theoretical energy density, but has good thermal stability, and the second battery unit uses the foregoing negative active material, which can ensure that the battery units inside the series module have good thermal stability and are not prone to thermal runaway.

In some embodiments, an energy density of a positive active material of the first battery unit is greater than an energy density of a positive active material of the second battery unit;

optionally, the positive active material of each first battery unit independently includes at least one of $LiNi_xCo_yMn_zO_2$ and lithium cobalt oxide, wherein $x+y+z=1$, $0<x<1$, $0<y<1$, and $0<z<1$; and the positive active material of each second battery unit independently includes at least one of $LiFe_aMn_bPO_4$, $Li_3V_2(PO_4)_3$, and lithium manganese oxide, wherein $a+b=1$, $0 \leq a \leq 1$, and $0 \leq b \leq 1$; and optionally, the positive active material of each first battery unit independently includes $LiNi_xCo_yMn_zO_2$, wherein $x+y+z=1$, $0.8 \leq x<1$, $0<y<0.2$, and $0<z<0.2$; and the positive active material of each second battery unit independently includes $LiNi_xCo_yMn_zO_2$, wherein $x+y+z=1$, $0<x<0.8$, $0<y<1$, and $0<z<1$.

By reasonably designing the energy densities of the positive active materials in the first battery unit and the second battery unit, the internal series battery has both a high energy density and thermal stability.

In some embodiments, each first battery unit independently includes a lithium-ion battery positive active material; and each second battery unit independently includes a sodium-ion battery positive material. A lithium-ion battery system has a higher energy density than a sodium-ion battery system. Through reasonable selection and design of the foregoing positive active materials, the internal series battery has safety performance while having a high energy density.

In some embodiments, positive active materials of each first battery unit and each second battery unit independently include $LiNi_xCo_yMn_zO_2$, wherein $x+y+z=1$, $0<x<1$, $0<y<1$, and $0<z<1$; and a compacted density of a positive active material layer of the first battery unit is less than a compacted density of a positive active material layer of the second battery unit. The compacted density of the positive active material layer of the first battery unit is less than the compacted density of the positive active material layer of the second battery unit, so that the first battery unit has relatively large internal resistance and generates more heat, which can increase temperatures of the battery units at the two ends, thereby increasing the energy densities of the battery units at the two ends; and the second battery unit has relatively small internal resistance and generates less heat, which can reduce a risk of thermal runaway of the battery unit in the middle. Therefore, the series battery has both a high energy density and good thermal stability.

In some embodiments, the energy density of the first battery unit is less than the energy density of the second battery unit. Typically, a battery system with a small energy density has good mechanical safety. Through reasonable design of the energy densities of the first battery unit and the second battery unit, the battery units at the two ends have small energy densities, but have good impact resistance, and the second battery unit has a high energy density, but has average mechanical safety. Through reasonable selection of the battery units, the internal series battery has both a high energy density and good mechanical safety.

In some embodiments, an energy density of a negative active material of the first battery unit is less than an energy density of a negative active material of the second battery unit. A negative active material with a large energy density typically has average mechanical strength, while a negative active material with an average energy density typically has good mechanical strength. Through reasonable selection and design of the negative active materials of the battery units, the internal series battery has both a high energy density and good mechanical safety.

Optionally, the negative active material of each first battery unit independently includes at least one of artificial graphite, natural graphite, soft carbon, hard carbon, and lithium titanium oxide; and the foregoing negative material has an average theoretical energy density, but has good mechanical strength, the first battery unit uses the foregoing negative material, and the battery units at the two ends of the series module have good mechanical safety and are not prone to a deformation failure.

Optionally, the negative active material of each second battery unit independently includes at least one of a silicon-based material, a tin-based material, and a lithium metal. The foregoing negative material has a high theoretical energy density, but has average mechanical strength, and the second battery unit uses the foregoing negative material, which can ensure that the battery units inside the series module have high energy densities, so that the internal series battery has a high energy density.

In some embodiments, an energy density of a positive active material of the first battery unit is less than an energy density of a positive active material of the second battery unit;

optionally, the positive active material of each first battery unit independently includes at least one of $LiFe_aMn_bPO_4$, $Li_3V_2(PO_4)_3$, and lithium manganese oxide, wherein $a+b=1$, $0\leq a\leq 1$, and $0\leq b\leq 1$; and the positive active material of each second battery unit independently includes at least one of $LiNi_xCo_yMn_zO_2$ and lithium cobalt oxide, wherein $x+y+z=1$, $0<x<1$, $0<y<1$, and $0<z<1$; and optionally, the positive active material of each first battery unit independently includes $LiNi_xCo_yMn_zO_2$, wherein $x+y+z=1$, $0<x<0.8$, $0<y<1$, and $0<z<1$; and the positive active material of each second battery unit independently includes $LiNi_xCo_yMn_zO_2$, wherein $x+y+z=1$, $0.8\leq x<1$, $0<y<0.2$, and $0<z<0.2$.

By reasonably designing the energy densities of the positive active materials in the first battery unit and the second battery unit, the internal series battery has both a high energy density and mechanical safety.

In some embodiments, each first battery unit independently includes a sodium-ion battery positive active material; and each second battery unit independently includes a lithium-ion battery positive material. The lithium-ion battery system has a higher energy density than the sodium-ion battery system, but has relatively poor mechanical safety. Through reasonable selection and design of the foregoing positive active materials, the internal series battery has both a high energy density and mechanical safety.

In some embodiments, a solid electrolyte layer of the second battery unit includes a high-safety additive;

optionally, the high-safety additive includes at least one of phosphate ester and fluorocarbonate;

optionally, the phosphate ester includes at least one of trimethyl phosphate and triethyl phosphate; and optionally, the fluorocarbonate includes at least one of methyl difluoroacetate and ethyl difluoroacetate.

The high-safety additive can enhance cycle stability and thermal stability of a secondary battery. The series module typically has a higher internal temperature than temperatures at the two ends. By adding the high-safety additive in a solid electrolyte of the second battery unit, the battery units inside the series module have good cycle stability and thermal stability, thereby reducing a risk of thermal runaway of the whole internal series battery, and enhancing cycle stability of the internal series battery.

In some embodiments, a solid electrolyte of the first battery unit has ionic conductivity of greater than $1\times10^{-3}$ S/cm at 25° C.; and a solid electrolyte of the second battery unit has ionic conductivity of less than or equal to $1\times10^{-3}$ S/cm at 25° C. The series module typically has a higher internal temperature than temperatures at the two ends. By reasonably designing the ionic conductivity of the first battery unit and the second battery unit, the internal series battery has small internal resistance and has good rate performance.

In a second aspect, this application further provides an electrical device. The electrical device includes the foregoing internal series battery in the first aspect. According to the foregoing internal series battery, the battery units are connected in series through the intermediate current collectors, and the internal series battery has low internal resistance, and a high energy density and power density, and can be used as a power supply of various electrical devices to meet electrical demands of the electrical devices.

Details of one or more embodiments of this application are set forth in the accompanying drawings and descriptions below, and other features, objectives and advantages of this application will be apparent from the specification, the accompanying drawings and the claims.

REFERENCE NUMERALS IN THE DRAWINGS

1. Internal series battery; 10. Series module; 110. Battery unit; 110*a*. First battery unit; 110*b*. Second battery unit; 111. Positive active material layer; 112. Solid electrolyte layer; 113. Negative active material layer; 120. Intermediate current collector; 20. Positive current collector; and 30. Negative current collector.

In order to better describe and illustrate those embodiments and/or examples of the invention disclosed herein, reference may be made to one or more accompanying drawings. Additional details or examples used to describe the accompanying drawings shall not be regarded as limiting the scope of any one of the disclosed invention, the currently described embodiments and/or examples, and these currently understood optimal modes of the invention.

DETAILED DESCRIPTION

For ease of understanding this application, this application will be more fully described below with reference to related accompanying drawings. Preferred embodiments of this application are given in the accompanying drawings. However, this application may be implemented in many different forms and is not limited to the embodiments described herein. Rather, these embodiments are provided for the purpose of providing a more thorough understanding of the disclosure of this application.

Unless otherwise defined, all technical and scientific terms used herein have the same meanings as commonly understood by a person skilled in the technical field to which this application pertains. The terms used herein in the specification of this application are merely for the purpose of describing specific embodiments and are not intended to limit this application. The term "and/or" used herein includes any and all combinations of one or more of the related listed items.

Figure 1:
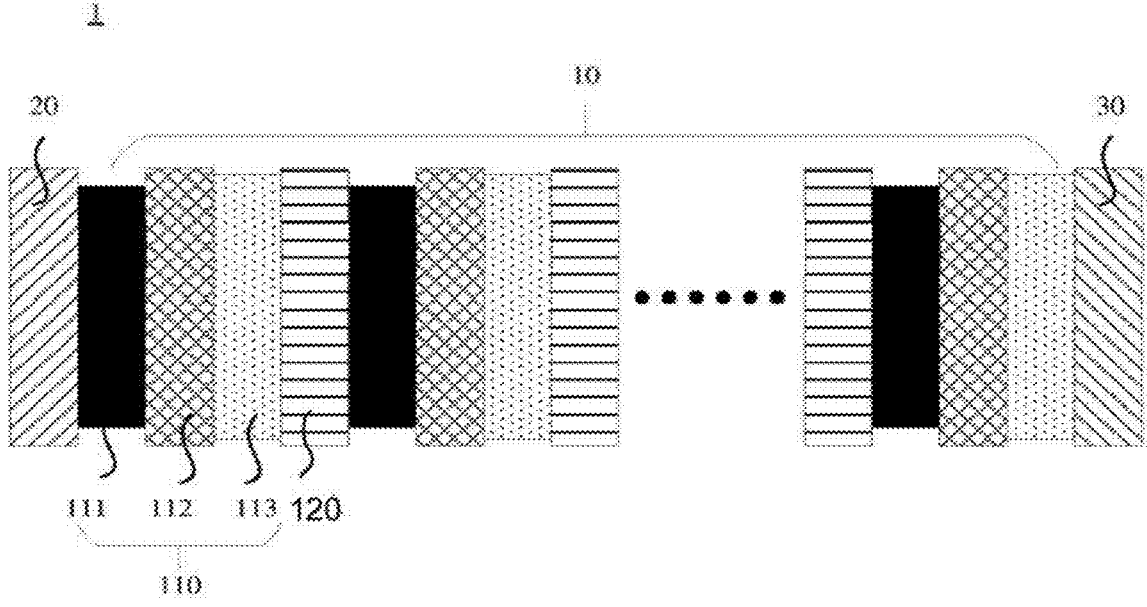
FIG. 1 is a schematic structural diagram of an internal series battery according to an implementation of this application.
Figure 2:
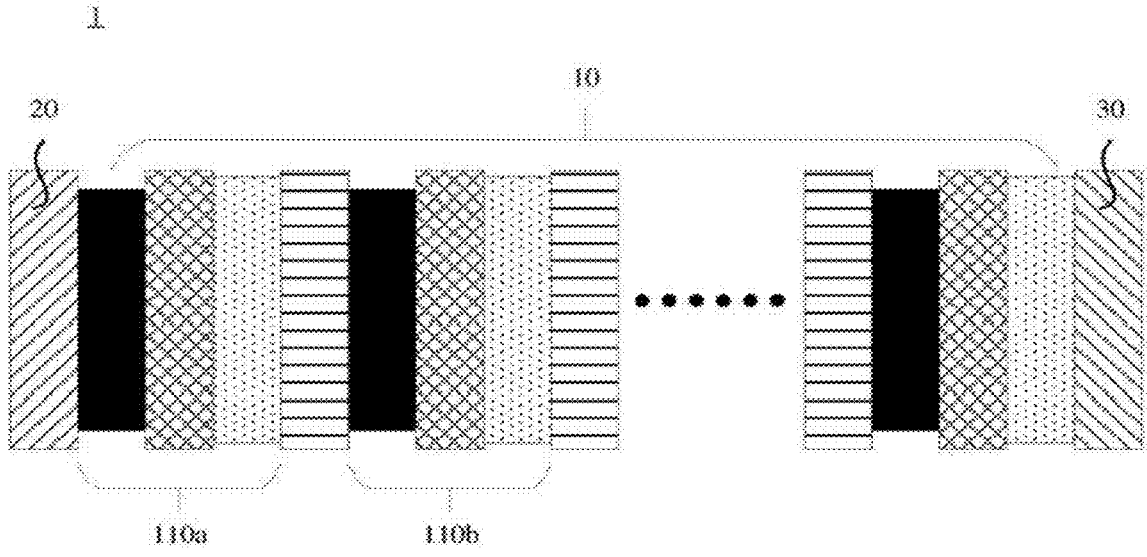
FIG. 2 is a schematic structural diagram of an internal series battery according to an implementation of this application.

Referring to FIG. 1 and FIG. 2, an implementation of this application provides an internal series battery 1. The internal series battery includes: a series module 10, a positive current collector 20, and a negative current collector 30.

The series module 10 includes battery units 110 and intermediate current collectors 120.

The number of the battery units 110 is greater than or equal to 3. It may be understood that according to demands for an energy density and a power density of the internal series battery 1, the number of the battery units 110 is 3, 4, 5, 6, or more.

Each of the battery units 110 includes a positive active material layer 111, a solid electrolyte layer 112, and a negative active material layer 113 that are stacked. Each of the intermediate current collectors 120 is disposed between the corresponding two adjacent battery units 110, and the two adjacent battery units 110 are connected in series through the intermediate current collector 120. The adjacent battery units 110 are connected in series through the intermediate current collectors 120, which has the advantages of modularity, efficient stacking manufacturing, low internal resistance, low cost, and the like, as compared with conventional external series battery cells.

The positive current collector 20 is located at one end of the series module 10 and electrically connected to the positive active material layer of the battery unit 110 at the end.

The negative current collector 30 is located at the other end of the series module 10 and electrically connected to the negative active material layer of the battery unit 110 at the end.

The battery units 110 include a first battery unit 110*a* and a second battery unit 110*b*. An energy density of the first battery unit 110*a* is the same as an energy density of any one of the battery units at two ends of the series module. An energy density of the second battery unit 110*b* is different from energy densities of the battery units at the two ends of the series module.

In the internal series battery 1 according to the implementation of this application, the battery units 110 are connected in series through the intermediate current collectors 120. Through reasonable design of the first battery unit 110*a* and the second battery unit 110*b* with different energy densities, the internal series battery 1 has both a high energy density and good safety performance.

Positive Active Material Layer

The positive active material layer includes a positive active material.

In some embodiments, when a battery unit is a lithium-ion battery, the positive active material may be a positive active material that is well known for use in the lithium-ion battery in the art. As an example, the positive active material may include at least one of the following materials: olivine-structured lithium-containing phosphate, lithium transition metal oxide, and a modified compound thereof. However, this application is not limited to such materials, and other conventional materials usable as a positive active material of a battery may further be used. Of such positive active materials, one may be used alone, or at least two may be used in combination. Examples of the lithium transition metal oxide may include, but are not limited to, at least one of lithium cobalt oxide (such as $LiCoO_2$), lithium nickel oxide (such as $LiNiO_2$), lithium manganese oxide (such as $LiMnO_2$, and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (briefly referred to as NCM333), $LiNi_{0.5}Co_{0.2}Mn_{0.3}O_2$ (briefly referred to as NCM523), $LiNi_{0.5}Co_{0.25}Mn_{0.25}O_2$ (briefly referred to as NCM211), $LiNi_{0.6}Co_{0.2}Mn_{0.2}O_2$ (briefly referred to as NCM622), $LiNi_{0.8}Co_{0.1}Mn_{0.1}O_2$ (briefly referred to as NCM811), lithium nickel cobalt aluminum oxide (such as $LiNi_{0.85}Co_{0.15}Al_{0.05}O_2$), or a modified compound thereof. Examples of the olivine-structured lithium-containing phosphate may include, but are not limited to, at least one of lithium iron phosphate (such as $LiFePO_4$ (briefly referred to as LFP)), a composite of lithium iron phosphate and carbon, lithium manganese phosphate (such as $LiMnPO_4$), a composite of lithium manganese phosphate and carbon, lithium manganese iron phosphate, or a composite of lithium manganese iron phosphate and carbon.

In some embodiments, when a battery unit is a sodium-ion battery, the positive active material may be a positive active material that is well known for use in the sodium-ion battery in the art. As an example, of such positive active materials, one may be used alone, or at least two may be used in combination. A positive active substance may be selected from sodium iron oxide ($NaFeO_2$), sodium cobalt oxide ($NaCoO_2$), sodium chromium oxide ($NaCrO_2$), sodium manganese oxide ($NaMnO_2$), sodium nickel oxide ($NaNiO_2$), sodium nickel titanium oxide ($NaNi_{1/2}Ti_{1/2}O_2$), sodium nickel manganese oxide ($NaNi_{1/2}Mn_{1/2}O_2$), sodium iron manganese oxide ($Na_{2/3}Fe_{1/3}Mn_{2/3}O_2$), sodium nickel cobalt manganese oxide ($NaNi_{1/3}CO_{1/3}Mn_{1/3}O_2$), a sodium iron phosphate compound ($NaFePO_4$), a sodium manganese phosphate compound ($NaMnPO_4$), a sodium cobalt phosphate compound ($NaCoPO_4$), a Prussian blue material, a polyanionic material (phosphate, fluorophosphate, pyrophosphate, and sulfate), and the like. However, this application is not limited to such materials, and other conventional well-known materials usable as the positive active substance of the sodium-ion battery may further be used.

In some embodiments, the positive active material layer further optionally includes a binder. As an example, the binder may include at least one of polyvinylidene fluoride (PVDF), polytetrafluoroethylene (PTFE), poly(vinylidene fluoride-co-tetrafluoroethylene-co-propylene), poly(vinylidene fluoride-co-hexafluoropropylene-co-tetrafluoroethylene, poly(tetrafluoroethylene-co-hexafluoropropylene), and fluorinated acrylate resin.

In some embodiments, the positive active material layer further optionally includes a conductive agent. As an example, the conductive agent may include at least one of superconducting carbon, acetylene black, carbon black, Ketjen black, carbon dots, carbon nanotubes, graphene and carbon nanofibers.

Negative Active Material Layer

The negative active material layer includes a negative active material.

In some embodiments, the negative active material may be a negative active material that is well known for use in the battery in the art. As an example, the negative active material may include at least one of the following materials: artificial graphite, natural graphite, soft carbon, hard carbon, a silicon-based material, a tin-based material, lithium titanium oxide, and the like. The silicon-based material may be at least one selected from simple-substance silicon, a silicon-oxygen compound, a silicon-carbon composite, a silicon-nitrogen composite, and silicon alloy. The tin-based material may be at least one selected from simple-substance tin, tin-oxygen compound, or tin alloy. However, this application is not limited to such materials, and other conventional materials usable as a negative active material of a battery may further be used. Of such negative active materials, one may be used alone, or at least two may be used in combination.

In some embodiments, the negative active material layer further optionally includes a binder. The binder may be at least one selected from styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative active material layer further optionally includes a conductive agent. The conductive agent may be at least one selected from superconductive carbon, acetylene black, carbon black, Ketjen black, carbon dots, carbon nanotubes, graphene, and carbon nanofibers.

In some embodiments, the negative active material layer further optionally includes other agents, such as a thickener (for example, sodium carboxymethyl cellulose (CMC-Na)).

Solid Electrolyte Layer

The solid electrolyte layer serves to conduct ions between the positive active material layer and the negative active material layer. In some embodiments, the solid electrolyte layer includes a polymer body and an electrolyte salt. In some embodiments, a mass ratio of the polymer body to the electrolyte salt is (20-80):80-20).

As an example, the polymer body may be at least one selected from a polyether polymer, a polyolefin polymer, a polynitrile polymer, and a polycarboxylate polymer. The polyether polymer includes at least one of polyethylene oxide (PEO), polypropylene oxide (PPO), polyethylene glycol (PEG), polyethylene glycol dimethyl ether (PEGDME), and polysiloxane. The polyolefin polymer includes at least one of polyethylene (PE), polypropylene (PP), polyvinylidene fluoride (PVDF), poly(polyvinylidene fluoride-co-hexafluoropropylene) (PVDF-HFP), polytetrafluoroethylene (PTFE), and polyvinyl chloride (PVC). The polynitrile polymer includes at least one of polyacrylonitrile (PAN) and poly(melamine). The polycarboxylate polymer includes at least one of polymethyl methacrylate (PMMA) and polymethyl acrylate (PMA). A polycarboxylate polymer includes at least one of poly(propylene carbonate) (PC) and poly (ethylene carbonate) (PEC).

As an example, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium bis(oxalato)borate, lithium difluorophosphate, lithium difluoro(oxalato)borate, lithium difluoro(bisoxalato) phosphate, and lithium tetrafluoro(oxalato)phosphate.

Intermediate Current Collector

In some embodiments, the intermediate current collector may be a metal foil or a composite current collector. For example, the metal foil may be a stainless steel foil or a titanium foil. For a battery unit in the sodium-ion battery system, the intermediate current collector may also be an aluminum foil.

The composite current collector may include a first metal layer and a second metal layer. The first metal layer includes aluminum, aluminum alloy, and the like. The second metal layer includes copper, copper alloy, and the like. In the series module, one side of the first metal layer of the intermediate current collector is close to the positive active material layer of one of the adjacent battery units, and one side of the second metal layer of the intermediate current collector is close to the negative active material layer of the other of the adjacent battery units.

Positive Current Collector

In some embodiments, the positive current collector may be a metal foil or a composite current collector. For example, the metal foil may be an aluminum foil. The composite current collector may include a polymer material substrate and a metal layer formed on at least one surface of the polymer material substrate. The composite current collector may be formed by forming a metal material (aluminum, aluminum alloy, nickel, nickel alloy, titanium, titanium alloy, silver, silver alloy, and the like) on the polymer material substrate (such as polypropylene (PP), polyethylene terephthalate (PET), polybutylene terephthalate (PBT), polystyrene (PS), or polyethylene (PE)).

Negative Current Collector

In some embodiments, the negative current collector may be a metal foil or a composite current collector. For example, as the metal foil, a copper foil may be used. The composite current collector may include a polymer material substrate and a metal layer formed on at least one surface of the polymer material substrate. The composite current collector may be formed by forming a metal material (copper, copper alloy, nickel, nickel alloy, titanium, titanium alloy, silver, silver alloy, and the like) on the polymer material substrate (such as polypropylene (PP), polyethylene terephthalate (PET), polybutylene terephthalate (PBT), polystyrene (PS), or polyethylene (PE)).

In some embodiments, a ratio of the number of the second battery unit to the total number of the battery units is (1-2):3. The number of the second battery unit is within the foregoing range, so that the energy density and safety performance of the internal series battery may be reasonably adjusted, and the internal series battery has good comprehensive performance.

Since the plurality of battery units 110 are connected in series, a battery unit inside the internal series battery 1 has a higher temperature than battery units at the two ends, and the internal battery unit has better energy density exertion and dynamic performance; but at the same time, the internal battery unit has a higher risk of thermal runaway.

In some embodiments, the energy density of the first battery unit 110a is greater than the energy density of the second battery unit 110b. Typically, a battery system with a large energy density has relatively poor thermal stability and a large risk of thermal failure. The energy density of the first battery unit 110a is greater than the energy density of the second battery unit 110b, which is advantageous to exertion of the theoretical energy density of the internal series battery 1, and the internal series battery 1 has a high energy density, good dynamic performance, and good thermal stability.

In some embodiments, the energy density of the negative active material of the first battery unit 110a is greater than the energy density of the negative active material of the second battery unit 110b. A negative active material with a large energy density typically has average thermal stability, while a negative active material with an average energy density typically has good thermal stability. Through reasonable selection and design of the negative active materials of the battery units 110, the internal series battery 1 has both a high energy density and good thermal stability.

Optionally, the negative active material of each first battery unit 110a independently includes at least one of a silicon-based material, a tin-based material, and a lithium metal; and the foregoing negative active material has a high theoretical energy density, but has average material thermal stability, the first battery unit 110a uses the foregoing negative active material, and the battery units at the two ends of the series module 10 have high energy densities, so that the internal series battery 1 can have thermal stability while improving the energy density.

Optionally, the negative active material of each second battery unit 110b independently includes at least one of artificial graphite, natural graphite, soft carbon, hard carbon, and lithium titanium oxide. The foregoing negative active material has an average theoretical energy density, but has good thermal stability, and the second battery unit 110b uses the foregoing negative active material, which can ensure that the battery units inside the series module 10 have good thermal stability and are not prone to thermal runaway.

In some embodiments, the energy density of the positive active material of the first battery unit 110a is greater than the energy density of the positive active material of the second battery unit 110b. By reasonably designing the energy densities of the positive active materials in the first battery unit 110a and the second battery unit 110b, the internal series battery 1 has both a high energy density and thermal stability.

Optionally, the positive active material of each first battery unit 110a independently includes at least one of $LiNi_xCo_yMn_zO_2$ and lithium cobalt oxide, where $x+y+z=1$, $0<x<1$, $0<y<1$, and $0<z<1$; and the positive active material of each second battery unit 110b independently includes at least one of $LiFe_aMn_bPO_4$, $Li_3V_2(PO_4)_3$, and lithium manganese oxide, where $a+b=1$, $0\leq a\leq 1$, and $0<b\leq 1$. The positive active materials such as $LiNi_xCo_yMn_zO_2$ and lithium cobalt oxide have high energy densities, and the positive active materials such as $LiFe_aMn_bPO_4$, $Li_3V_2(PO_4)_3$, and lithium manganese oxide have low energy densities. Therefore, by reasonably designing the energy densities of the positive active materials in the first battery unit 110a and the second battery unit 110b, the internal series battery 1 has both a high energy density and thermal stability.

Optionally, the positive active material of each first battery unit 110a independently includes $LiNi_xCo_yMn_zO_2$, where $x+y+z=1$, $0.8\leq x<1$, $0<y<0.2$, and $0<z<0.2$; and the positive active material of each second battery unit 110b independently includes $LiNi_xCo_yMn_zO_2$, where $x+y+z=1$, $0<x<0.8$, $0<y<1$, and $0<z<1$. The first battery unit 110a uses high-nickel $LiNi_xCo_yMn_zO_2$, and the second battery unit 110b uses low-nickel $LiNi_xCo_yMn_zO_2$, such that the energy density of the positive active material of the first battery unit 110a is greater than the energy density of the positive active material of the second battery unit 110b. By reasonably designing the energy densities of the positive active materials in the first battery unit 110a and the second battery unit 110b, the internal series battery 1 has both a high energy density and thermal stability.

In some embodiments, each first battery unit 110a independently includes a lithium-ion battery positive active material; and each second battery unit 110b independently includes a sodium-ion battery positive material. The lithium-ion battery system has a higher energy density compared to the sodium-ion battery system. Through reasonable selection and design of the foregoing positive active materials, the internal series battery 1 has safety performance while having a high energy density.

In some embodiments, positive active materials of each first battery unit 110a and each second battery unit 110b independently include $LiNi_xCo_yMn_zO_2$, where $x+y+z=1$, $0<x<1$, $0<y<1$, and $0<z<1$; and a compacted density of a positive active material layer of the first battery unit 110a is less than a compacted density of a positive active material layer of the second battery unit 110b. The $LiNi_xCo_yMn_zO_2$ material has a high energy density, and the compacted density of the positive active material layer of the first battery unit 110a is less than the compacted density of the positive active material layer of the second battery unit 110b, so that the first battery unit 110a has relatively large internal resistance and generates more heat, which can increase temperatures of the battery units 110 at the two ends, thereby increasing the energy densities of the battery units 110 at the two ends; and the second battery unit 110b has relatively small internal resistance and generates less heat, which can reduce a risk of thermal runaway of the battery unit 110 in the middle. Therefore, the internal series battery 1 has both a high energy density and good thermal stability. Further, the positive active material $LiNi_xCo_yMn_zO_2$ of each first battery unit 110a includes a monocrystal particle and a polycrystal particle; a mass ratio of the monocrystal particle to the polycrystal particle ranges from (1:9) to (4:6), optionally, (1.5:8.5) to (2.5:7.5); the positive active material $LiNi_xCo_yMn_zO_2$ of each second battery unit 110b includes a monocrystal particle and a polycrystal particle; and a mass ratio of the monocrystal particle to the polycrystal particle is less than 1:9 or greater than 4:6.

The energy density of the internal series battery 1 is increased by connecting the plurality of battery units 110 in series. However, once the internal series battery 1 is impacted and destroyed, the hazard is also high, so the mechanical safety requirement for the internal series battery 1 is also high.

In some embodiments, the energy density of the first battery unit 110a is less than the energy density of the second battery unit 110b. Typically, a battery system with a small energy density has good mechanical safety. Through reasonable design of the energy densities of the first battery unit 110a and the second battery unit 110b, the battery units 110 at the two ends have small energy densities, but have good impact resistance, and the second battery unit 110b has a high energy density, but has average mechanical safety. Through reasonable selection of the battery units 110, the internal series battery 1 has both a high energy density and good mechanical safety.

In some embodiments, the energy density of the negative active material of the first battery unit 110a is less than the energy density of the negative active material of the second battery unit 110b. A negative active material with a large energy density typically has average mechanical strength, while a negative active material with an average energy density typically has good mechanical strength. Through reasonable selection and design of the negative active materials of the battery units 110, the internal series battery 1 has both a high energy density and good mechanical safety.

Optionally, the negative active material of each first battery unit 110a independently includes at least one of artificial graphite, natural graphite, soft carbon, hard carbon, and lithium titanium oxide. The foregoing negative material has an average theoretical energy density, but has good mechanical strength, the first battery unit 110a uses the foregoing negative material, and the battery units at the two ends of the series module 10 have good mechanical safety and are not prone to a deformation failure.

Optionally, the negative active material of each second battery unit 110b independently includes at least one of a silicon-based material, a tin-based material, and a lithium metal. The foregoing negative material has a high theoretical energy density, but has average mechanical strength, and the second battery unit 110b uses the foregoing negative material, which can ensure that the battery units 110 inside the series module 10 have high energy densities, so that the internal series battery 1 has a high energy density.

In some embodiments, the energy density of the positive active material of the first battery unit 110a is less than the energy density of the positive active material of the second battery unit 110b.

Optionally, the positive active material of each first battery unit 110a independently includes at least one of $LiFe_aMn_bPO_4$, $Li_3V_2(PO_4)_3$, and lithium manganese oxide, where a+b=1, 0≤a≤1, and 0≤b≤1; and the positive active material of each second battery unit 110b independently includes $LiNi_xCo_yMn_zO_2$ and lithium cobalt oxide, where x+y+z=1, 0<x<1, 0<y<1, and 0<z<1. The positive active materials such as $LiNi_xCo_yMn_zO_2$ and lithium cobalt oxide have high energy densities, but have average mechanical safety, and the positive active materials such as $LiFe_aMn_bPO_4$, $Li_3V_2(PO_4)_3$, and lithium manganese oxide have low energy densities, but have good mechanical safety. By reasonably designing the energy densities of the positive active materials in the first battery unit 110a and the second battery unit 110b, the internal series battery 1 has both a high energy density and mechanical safety.

Optionally, the positive active material of each first battery unit 110a independently includes $LiNi_xCo_yMn_zO_2$, where x+y+z=1, 0<x<0.8, 0<y<1, and 0<z<1; and the positive active material of each second battery unit 110b independently includes $LiNi_xCo_yMn_zO_2$, where x+y+z=1, 0.8≤x<1, 0<y<0.2, and 0<z<0.2. The first battery unit 110a uses low-nickel $LiNi_xCo_yMn_zO_2$, and the second battery unit 110b uses high-nickel $LiNi_xCo_yMn_zO_2$, such that the energy density of the positive active material of the first battery unit 110a is less than the energy density of the positive active material of the second battery unit 110b. By reasonably designing the energy densities of the positive active materials in the first battery unit 110a and the second battery unit 110b, the internal series battery 1 has both a high energy density and mechanical safety.

By reasonably designing the energy densities of the positive active materials in the first battery unit 110a and the second battery unit 110b, the internal series battery 1 has both a high energy density and mechanical safety.

In some embodiments, each first battery unit 110a independently includes a sodium-ion battery positive active material; and each second battery unit 110b independently includes a lithium-ion battery positive material. The lithium-ion battery system has a higher energy density compared to the sodium-ion battery system, but has relatively poor mechanical safety. Through reasonable selection and design of the foregoing positive active materials, the internal series battery 1 has both a high energy density and mechanical safety.

In some embodiments, a solid electrolyte layer 112 of the second battery unit 110b includes a high-safety additive. The high-safety additive can enhance cycle stability and thermal stability of the secondary battery. The series module 10 typically has a higher internal temperature than temperatures at the two ends. By adding the high-safety additive in a solid electrolyte of the second battery unit 110b, the battery units inside the series module have good cycle stability and thermal stability, thereby reducing a risk of thermal runaway of the whole internal series battery, and enhancing cycle stability of the internal series battery.

In some embodiments, the high-safety additive includes at least one of phosphate ester and fluorocarbonate.

In some embodiments, the phosphate ester includes at least one of trimethyl phosphate and triethyl phosphate.

In some embodiments, the fluorocarbonate includes at least one of methyl difluoroacetate and ethyl difluoroacetate.

In some embodiments, a solid electrolyte layer of the first battery unit 110a has ionic conductivity of greater than $1\times10^{-3}$ S/cm at 25° C.; and the solid electrolyte layer of the second battery unit 110b has ionic conductivity of less than or equal to $1\times10^{-3}$ S/cm at 25° C. The series module typically has a higher internal temperature than temperatures at the two ends, so that the dynamic performance of the battery units at the two ends is typically not as good as the dynamic performance of the battery units inside the series module. By reasonably designing the ionic conductivity of the first battery unit 110$a$ and the second battery unit 110$b$, the whole internal series battery has small internal resistance and good rate performance. Specifically, the ionic conductivity of the solid electrolyte layer may be tested according to the following method: (1) Cut the solid electrolyte layer into a round sheet with a diameter of 19 mm, and perform drying for later use. (2) Assemble the round sheet into a "standard stainless steel washer/electrolyte/standard stainless steel washer" CR2032 button experimental battery in an inert gas glove box, with a battery packaging pressure of 5 MPa, and preserve at 25° C. for 1 h. (3) Use an electrochemical workstation to measure to obtain a corresponding Nyquist plot according to electrochemical impedance spectroscopy (EIS), with an environment temperature T (in a unit of ° C.), a test frequency range of 1 MHz to 100 mHz, and a disturbance voltage of 10 mV. (4) After the test, disassemble the battery, measure a thickness L (in a unit of cm) of the round sheet and an area S (in a unit of cm$^2$) of the standard washer, fit the Nyquist plot to obtain resistance R (in a unit of $\Omega$), and calculate ionic conductivity $\sigma$ (in a unit of S/cm) of a solid electrolyte at the temperature of T according to a formula $$\sigma = \frac{L}{RS}.$$

In addition, this application further provides an electrical device. The electrical device includes the internal series battery provided by this application. The internal series battery may be used as a power supply of the electrical device, and may also be used as an energy storage unit of the electrical device. The electrical device may include, but not limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship and a satellite, or an energy storage system.

Figure 3:
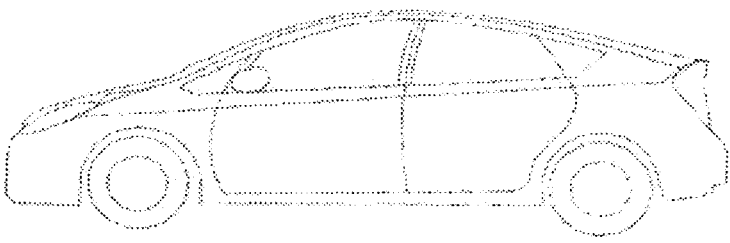
FIG. 3 is a schematic diagram of an electrical device using an internal series battery as a power supply according to an implementation of this application.

FIG. 3 is an example of the electrical device. The electrical device is a battery electric vehicle, a hybrid electric vehicle, a plug-in hybrid electric vehicle, or the like. As another example, a device may be a mobile phone, a tablet computer, a laptop computer, or the like.

EMBODIMENT

The embodiments of this application are illustrated below. The embodiments described below are exemplary merely for the purpose of explaining this application, and shall not be construed as limiting this application. Where specific technologies or conditions are not indicated in the embodiments, follow technologies or conditions described in documents in the art or a product specification. Reagents or instruments used without indication of manufacturers are conventional products that are commercially available.

The internal series battery in the embodiments is prepared according to the following steps:

Prepare a composite electrode plate: Coat a surface of one side of a stainless steel foil of an intermediate current collector with a positive slurry evenly, and coat a surface of the other side of the intermediate current collector with a negative slurry evenly; and perform drying and cold pressing to obtain the composite electrode plate, where the composite electrode plate includes a positive active material layer, the intermediate current collector, and a negative active material layer that are stacked.

Prepare a single-sided positive electrode plate: Coat a surface of one side of an aluminum foil of a positive current collector with a positive slurry evenly; and perform drying and cold pressing to obtain the single-sided positive electrode plate.

Prepare a single-sided negative electrode plate: Coat a surface of one side of a copper foil of a negative current collector with a negative slurry evenly; and perform drying and cold pressing to obtain the single-sided negative electrode plate.

Prepare a solid electrolyte layer: Mix a polymer body, an electrolyte salt and a solvent at 25° C. evenly, and then perform drying and hot pressing to obtain the solid electrolyte layer.

Prepare an internal series battery: Stack the prepared single-sided positive electrode plate, solid electrolyte layer, composite electrode plate and single-sided negative electrode plate according to the design of the internal series battery in an order of single-sided positive electrode plate, solid electrolyte layer, composite electrode plate, solid electrolyte layer, composite electrode plate, . . . , composite electrode plate, solid electrolyte layer, and single-sided negative electrode plate, and perform roll forming to obtain a battery assembly. Put the battery assembly in a package shell, and perform welding, packaging and other procedures to prepare the internal series battery. The positive active material layer, the solid electrolyte layer and the negative active material layer that are stacked form a battery unit, and there are four battery units in the internal series battery. The internal series battery includes a first battery unit, a second battery unit, a second battery unit, and a first battery unit that are stacked. That is, the first battery units are at two ends of a series module, and the second battery units are battery units inside the series module.

Test Part:

Energy Density Test:

Charge an internal series battery to an upper limit voltage at 0.33 C, turn to charging at a constant voltage until a charging current is decreased to 0.05 C, perform standing for 30 minutes, perform discharging to a lower limit voltage at 0.33 C, and record discharge energy E (Wh) and discharge capacity C0 (Ah). Weigh the internal series battery, and record the weight W (kg) of the internal series battery. Energy density=E/W (Wh/kg).

Thermal Stability Test:

The thermal stability test uses a hot box test to obtain a temperature at which the internal series battery fails (catching a fire, exploding). The specific steps are: with an initial temperature of 25° C., heat the internal series battery to 100° C. at 5° C./min, and perform standing for 30 minutes; perform heating at 5° C./min and perform heat preservation for 30 minutes every 5° C. until the internal series battery fails, and record a failure time of the internal series battery and a temperature of an internal battery unit at which a thermal failure of the internal series battery occurs.

Mechanical Safety Test:

The mechanical safety test is used to test a failure deformation amount of an internal series battery by squeezing the internal series battery. In a stacking direction of battery units, pressing one end of the internal series battery at a squeezing speed of 2 mm/s using a semi-cylinder with a radius of 75 mm, continuously preform squeezing until the internal series battery fails (catching a fire, exploding), and record a displacement of the semi-cylinder at this time, where failure deformation amount (%)=semi-cylinder displacement/length of internal series battery in stacking direction of battery units.

Rate Performance Test:

Charge an internal series battery to an upper limit voltage at 0.33 C, turn to charging at a constant voltage until a charging current is decreased to 0.05 C, perform standing for 30 minutes, perform discharging to a lower limit voltage at 2 C, and record discharge capacity C1 (Ah). Rate performance is represented by a capacity retention rate, and capacity retention rate=C1/C0(%).

For a single battery unit, surfaces of a positive active material layer and a negative active material layer of the single battery unit are attached to a current collector respectively, and then a conventional secondary battery may be obtained. The performance of the single battery unit may also be tested through the method in the foregoing test part.

For design of an internal series battery in Embodiment 1-1 to Embodiment 1-12 and Comparative Embodiment 1-1 to Comparative Embodiment 1-5, see Table 1.

In Table 1, an NCM811 positive active material layer is composed of: NCM811, PVDF, and carbon black as a conductive agent at a mass ratio of 97:2:1. An NCM333 positive active material layer is composed of: NCM333, PVDF, and carbon black as a conductive agent at a mass ratio of 97:2:1. An LFP positive active material layer is composed of: LFP, PVDF, and carbon black as a conductive agent at a mass ratio of 97:2:1. An NCM811 (having a mass ratio of monocrystal to polycrystal of 8:2) positive active material layer is composed of: monocrystal NCM811, polycrystal NCM811, PVDF, and carbon black as a conductive agent at a mass ratio of 77.6:19.4:2:1, with a compacted density of 3.3 g/cm$^3$. An NCM811 (having a mass ratio of monocrystal to polycrystal of 2:8) positive active material layer is composed of: monocrystal NCM811, polycrystal NCM811, PVDF, and carbon black as a conductive agent at a mass ratio of 19.4:77.6:2:1, with a compacted density of 3.4 g/cm$^3$. A Na$_2$MnFe(CN)$_6$ positive active material layer is composed of: Na$_2$MnFe(CN)$_6$, PVDF, and carbon black as a conductive agent at a mass ratio of 97:2:1. A silicon-based negative active material layer is composed of: a silicon-based material, carbon black as a conductive agent, styrene-butadiene rubber (SBR) as a binder, and sodium carboxymethyl cellulose (CMC-Na) as a thickener at a mass ratio of 97:0.5:1.25:1.25. A graphite negative active material layer is composed of: graphite, carbon black as a conductive agent, styrene-butadiene rubber (SBR) as a binder, and sodium carboxymethyl cellulose (CMC-Na) as a thickener at a mass ratio of 97:0.5:1.25:1.25. A hard carbon negative active material layer is composed of: hard carbon, carbon black as a conductive agent, styrene-butadiene rubber (SBR) as a binder, and sodium carboxymethyl cellulose (CMC-Na) as a thickener at a mass ratio of 97:0.5:1.25:1.25. A PEO-LiTFSI solid electrolyte layer is composed of: PEO and LiTFSI at a mass ratio of 25:75. A Na-β-Al$_2$O$_3$ solid electrolyte layer is composed of: Na-β-Al$_2$O$_3$ at a mass percentage of 100%.

TABLE 1

| | First battery unit | | | | Second battery unit | | | | | |
|---|---|---|---|---|---|---|---|---|---|---|
| | Positive | Solid electrolyte layer | | Negative | Positive | Solid electrolyte layer | | Negative | | |
| Sequence number | active material layer | Composition | Ionic conductivity (mS/cm) | active material layer | active material layer | Composition | Ionic conductivity (mS/cm) | active material layer | Energy density (Wh/kg) | Thermal stability |
| Embodiment 1-1 | NCM811 | PEO-LiTFSI | 1 | Silicon-based | LFP | PEO-LiTFSI | 1 | Graphite | 330 | 180 |
| Embodiment 1-2 | NCM811 | PEO-LiTFSI | 1 | Graphite | LFP | PEO-LiTFSI | 1 | Graphite | 310 | 190 |
| Embodiment 1-3 | NCM811 | PEO-LiTFSI | 1 | Silicon-based | LFP | PEO-LiTFSI | 1 | Silicon-based | 335 | 170 |
| Embodiment 1-4 | NCM811 | PEO-LiTFSI | 1 | Silicon-based | NCM333 | PEO-LiTFSI | 1 | Graphite | 350 | 145 |
| Embodiment 1-5 | NCM811 | PEO-LiTFSI | 1 | Graphite | NCM333 | PEO-LiTFSI | 1 | Graphite | 331 | 157 |
| Embodiment 1-6 | NCM811 | PEO-LiTFSI | 1 | Silicon-based | NCM333 | PEO-LiTFSI | 1 | Silicon-based | 358 | 130 |
| Embodiment 1-7 | NCM811, having a mass ratio of monocrystal to polycrystal of 8:2 | PEO-LiTFSI | 1 | Silicon-based | NCM811, having a mass ratio of monocrystal to polycrystal of 2:8 | PEO-LiTFSI | 1 | Graphite | 350 | 150 |
| Embodiment 1-8 | NCM811, having a mass ratio of monocrystal to polycrystal of 8:2 | PEO-LiTFSI | 1 | Graphite | NCM811, having a mass ratio of monocrystal to polycrystal of 2:8 | PEO-LiTFSI | 1 | Graphite | 335 | 159 |
| Embodiment 1-9 | NCM811, having a mass ratio of monocrystal to polycrystal of 8:2 | PEO-LiTFSI | 1 | Silicon-based | NCM811, having a mass ratio of monocrystal to polycrystal of 2:8 | PEO-LiTFSI | 1 | Silicon-based | 357 | 138 |
| Embodiment 1-10 | NCM811 | PEO-LiTFSI | 1 | Silicon-based | Na$_2$MnFe(CN)$_6$ | Na-β-Al$_2$O$_3$ | 1 | Hard carbon | 300 | 170 |
| Embodiment 1-11 | NCM811 | PEO-LiTFSI | 1 | Graphite | Na$_2$MnFe(CN)$_6$ | Na-β-Al$_2$O$_3$ | 1 | Hard carbon | 280 | 180 |

TABLE 1-continued

| Sequence number | First battery unit | | | | Second battery unit | | | | Energy density (Wh/kg) | Thermal stability |
|---|---|---|---|---|---|---|---|---|---|---|
| | Positive active material layer | Solid electrolyte layer Composition | Ionic conductivity (mS/cm) | Negative active material layer | Positive active material layer | Solid electrolyte layer Composition | Ionic conductivity (mS/cm) | Negative active material layer | | |
| Embodiment 1-12 | NCM811 | PEO-LiTFSI | 1 | Silicon-based | NCM811 | PEO-LiTFSI | 1 | Graphite | 370 | 150 |
| Comparative Embodiment 1-1 | NCM811 | PEO-LiTFSI | 1 | Silicon-based | NCM811 | PEO-LiTFSI | 1 | Silicon-based | 385 | 130 |
| Comparative Embodiment 1-2 | NCM811 | PEO-LiTFSI | 1 | Graphite | NCM811 | PEO-LiTFSI | 1 | Graphite | 358 | 165 |
| Comparative Embodiment 1-3 | LFP | PEO-LiTFSI | 1 | Silicon-based | LFP | PEO-LiTFSI | 1 | Silicon-based | 220 | 225 |
| Comparative Embodiment 1-4 | LFP | PEO-LiTFSI | 1 | Graphite | LFP | PEO-LiTFSI | 1 | Graphite | 200 | 240 |
| Comparative Embodiment 1-5 | $Na_2MnFe(CN)_6$ | $Na\text{-}\beta\text{-}Al_2O_3$ | 1 | Hard carbon | $Na_2MnFe(CN)_6$ | $Na\text{-}\beta\text{-}Al_2O_3$ | 1 | Hard carbon | 150 | 180 |

It can be seen from related data in Table 1 that in Embodiments 1-1 to 1-12, by adjusting the compositions of the first battery unit and the second battery unit, the internal series battery in Embodiments 1-1 to 1-12 has an energy density ranging from 280 Wh/kg to 370 Wh/kg, and an internal temperature ranging from 130° C. to 190° C. when failing, and the internal series battery has both a high energy density and good thermal stability. In the internal series battery in Comparative Embodiments 1-1 to 1-5, the compositions of the first battery unit and the second battery unit are the same, and it is difficult for the obtained internal series battery to have both a high energy density and good thermal stability.

For design of an internal series battery in Embodiment 2-1 to Embodiment 2-9, see Table 2.

In Table 2, an NCM811 positive active material layer is composed of: NCM811, PVDF, and carbon black as a conductive agent at a mass ratio of 97:2:1. An NCM333 positive active material layer is composed of: NCM333, PVDF, and carbon black as a conductive agent at a mass ratio of 97:2:1. An LFP positive active material layer is composed of: LFP, PVDF, and carbon black as a conductive agent at a mass ratio of 97:2:1. A $Na_2MnFe(CN)_6$ positive active material layer is composed of: $Na_2MnFe(CN)_6$, PVDF, and carbon black as a conductive agent at a mass ratio of 97:2:1. A silicon-based negative active material layer is composed of: a silicon-based material, carbon black as a conductive agent, styrene-butadiene rubber (SBR) as a binder, and sodium carboxymethyl cellulose (CMC-Na) as a thickener at a mass ratio of 97:0.5:1.25:1.25. A graphite negative active material layer is composed of: graphite, carbon black as a conductive agent, styrene-butadiene rubber (SBR) as a binder, and sodium carboxymethyl cellulose (CMC-Na) as a thickener at a mass ratio of 97:0.5:1.25:1.25. A hard carbon negative active material layer is composed of: hard carbon, carbon black as a conductive agent, styrene-butadiene rubber (SBR) as a binder, and sodium carboxymethyl cellulose (CMC-Na) as a thickener at a mass ratio of 97:0.5:1.25:1.25. A PEO-LiTFSI solid electrolyte layer is composed of: PEO and LiTFSI at a mass ratio of 25:75. A $Na\text{-}\beta\text{-}Al_2O_3$ solid electrolyte layer is composed of: $Na\text{-}\beta\text{-}Al_2O_3$ at a mass percentage of 100%.

TABLE 2

| Sequence number | First battery unit | | | | Second battery unit | | | | Energy density (Wh/kg) | Mechanical safety (%) |
|---|---|---|---|---|---|---|---|---|---|---|
| | Positive active material layer | Solid electrolyte layer Composition | Ionic conductivity (mS/cm) | Negative active material layer | Positive active material layer | Solid electrolyte layer Composition | Ionic conductivity (mS/cm) | Negative active material layer | | |
| Embodiment 2-1 | LFP | PEO-LiTFSI | 1 | Graphite | NCM811 | PEO-LiTFSI | 1 | Silicon-based | 310 | 35 |
| Embodiment 2-2 | LFP | PEO-LiTFSI | 1 | Graphite | NCM811 | PEO-LiTFSI | 1 | Graphite | 299 | 40 |
| Embodiment 2-3 | LFP | PEO-LiTFSI | 1 | Silicon-based | NCM811 | PEO-LiTFSI | 1 | Silicon-based | 315 | 29 |
| Embodiment 2-4 | NCM333 | PEO-LiTFSI | 1 | Graphite | NCM811 | PEO-LiTFSI | 1 | Silicon-based | 320 | 28 |
| Embodiment 2-5 | NCM333 | PEO-LiTFSI | 1 | Graphite | NCM811 | PEO-LiTFSI | 1 | Graphite | 311 | 34 |
| Embodiment 2-6 | NCM333 | PEO-LiTFSI | 1 | Silicon-based | NCM811 | PEO-LiTFSI | 1 | Silicon-based | 328 | 23 |

TABLE 2-continued

| | First battery unit | | | | Second battery unit | | | | | |
| | Solid electrolyte layer | | | | | Solid electrolyte layer | | | | |
| Sequence number | Positive active material layer | Composition | Ionic conductivity (mS/cm) | Negative active material layer | Positive active material layer | Composition | Ionic conductivity (mS/cm) | Negative active material layer | Energy density (Wh/kg) | Mechanical safety (%) |
|---|---|---|---|---|---|---|---|---|---|---|
| Embodiment 2-7 | $Na_2MnFe(CN)_6$ | $Na-\beta-Al_2O_3$ | 1 | Hard carbon | NCM811 | PEO-LiTFSI | 1 | Silicon-based | 270 | 30 |
| Embodiment 2-8 | $Na_2MnFe(CN)_6$ | $Na-\beta-Al_2O_3$ | 1 | Hard carbon | NCM811 | PEO-LiTFSI | 1 | Graphite | 262 | 34 |
| Embodiment 2-9 | NCM811 | PEO-LiTFSI | 1 | Graphite | NCM811 | PEO-LiTFSI | 1 | Silicon-based | 368 | 29 |
| Comparative Embodiment 1-1 | NCM811 | PEO-LiTFSI | 1 | Silicon-based | NCM811 | PEO-LiTFSI | 1 | Silicon-based | 380 | 25 |
| Comparative Embodiment 1-2 | NCM811 | PEO-LiTFSI | 1 | Graphite | NCM811 | PEO-LiTFSI | 1 | Graphite | 359 | 33 |
| Comparative Embodiment 1-3 | LFP | PEO-LiTFSI | 1 | Silicon-based | LFP | PEO-LiTFSI | 1 | Silicon-based | 215 | 31 |
| Comparative Embodiment 1-4 | LFP | PEO-LiTFSI | 1 | Graphite | LFP | PEO-LiTFSI | 1 | Graphite | 200 | 35 |
| Comparative Embodiment 1-5 | $Na_2MnFe(CN)_6$ | $Na-\beta-Al_2O_3$ | 1 | Hard carbon | $Na_2MnFe(CN)_6$ | $Na-\beta-Al_2O_3$ | 1 | Hard carbon | 150 | 30 |

It can be seen from related data in Table 2 that in Embodiments 2-1 to 2-10, by adjusting the compositions of the first battery unit and the second battery unit, the internal series battery in Embodiments 2-1 to 2-10 has an energy density ranging from 262 Wh/kg to 368 Wh/kg, and a failure deformation amount ranging from 23% to 40%, and the internal series battery has both a high energy density and good mechanical safety. The internal series battery in Embodiment 2-1 to Embodiment 2-10 has better comprehensive performance than that in Comparative Embodiments 1-1 to 1-5.

The internal series battery in Embodiment 3-1 to Embodiment 3-4 differs from that in Embodiment 1-1 in that there is a difference in composition and ionic conductivity of the solid electrolyte layer. For design of an internal series battery in Embodiment 3-1 to Embodiment 3-4, see Table 3. In Embodiment 3-1 to Embodiment 3-4, a PEO-LiTFSI solid electrolyte layer with conductivity of 1 mS/cm is composed of: PEO and LiTFSI at a mass ratio of 25:75. A PEO-LiTFSI solid electrolyte layer with conductivity of 3 mS/cm is composed of: EC as a plasticizer, PEO and LiTFSI at a mass ratio of 20:20:60.

TABLE 3

| | Solid electrolyte layer of first battery unit | | Solid electrolyte layer of second battery unit | | Rate | | |
| Sequence number | Ionic conductivity (mS/cm) | High-safety additive (content) | Ionic conductivity (mS/cm) | High-safety additive (content) | Energy density (Wh/kg) | performance (2 C vs 0.33 C, %) | Thermal stability (° C.) |
|---|---|---|---|---|---|---|---|
| Embodiment 1-1 | 1 | / | 1 | / | 330 | 80 | 180 |
| Embodiment 3-1 | 3 | / | 1 | Ethyl difluoroacetate (5 wt %) | 345 | 83 | 200 |
| Embodiment 3-2 | 3 | / | 3 | / | 350 | 85 | 140 |
| Embodiment 3-3 | 3 | Ethyl difluoroacetate (5 wt %) | 3 | Ethyl difluoroacetate (5 wt %) | 350 | 85 | 170 |
| Embodiment 3-4 | 1 | Ethyl difluoroacetate (5 wt %) | 1 | Ethyl difluoroacetate (5 wt %) | 330 | 80 | 189 |

From related data in Table 3, as can be seen from Embodiment 3-2, the ionic conductivity of the solid electrolyte layer has an impact on the energy density, rate performance and thermal stability of the internal series battery. When the solid electrolyte layer has large ionic conductivity, the internal series battery has good energy density and rate performance, but the thermal stability of the internal series battery is decreased. As can be seen from the comparison of Embodiments 3-2 to 3-4, the high-safety additive can improve the thermal stability of the internal series battery. In the internal series battery in Embodiment 3-1, the solid electrolyte layer of the first battery unit has ionic conductivity of 3 mS/cm, no high-safety additive is added, the solid electrolyte layer of the second battery unit has ionic conductivity of 1 mS/cm, ethyl difluoroacetate is added, and the prepared internal series battery has an energy density of 345 Wh/kg, rate performance of 83%, and an internal temperature of 200° C. when failing. The internal series battery in Embodiment 3-1 has better comprehensive performance compared to the internal series battery in Embodiments 3-2 to 3-4.

Various technical features of the foregoing embodiments may be combined arbitrarily, and all possible combinations of the various technical features of the foregoing embodiments have not been described for the sake of concise description; however, as long as there is no conflict in the combinations of these technical features, they shall all be regarded as falling within the scope of this specification.

The foregoing embodiments express only several implementations of this application, which are described specifically and in detail, but are not to be construed as limiting the scope of the invention patent. It is hereby indicated that for a person of ordinary skill in the art, many variations and improvements may further be made without departing from the conception of this application, all of which fall within the scope of protection of this application. Therefore, the scope of protection of this application patent shall be determined by the appended claims.

What is claimed is:

1. An internal series battery, comprising:
a series module, comprising battery units and intermediate current collectors; a number of the battery units being greater than or equal to 3, each of the battery units comprising a positive active material layer, a solid electrolyte layer, and a negative active material layer that are stacked; each of the intermediate current collectors being corresponding to and disposed between two adjacent battery units, and the two adjacent battery units being connected in series through the intermediate current collector;
a positive current collector, located at one end of the series module and electrically connected to the positive active material layer of the battery unit at one end of two ends of the series module opposite to each other; and
a negative current collector, located at the other end of the series module and electrically connected to the negative active material layer of the battery unit at the other end of the two ends of the series module,
wherein the battery units comprise at least two first battery units and at least one second battery unit; the at least two first battery units comprise two battery units respectively at the two ends of the series module, the at least one second battery unit is inside the series module between the two first battery units;
wherein an energy density of each first battery unit is greater than an energy density of each second battery unit; each first battery unit independently comprises a lithium-ion battery positive active material, each second battery unit independently comprises a sodium-ion battery positive active material; a ratio of a number of the at least one second battery unit to a total number of the battery units is 1/3 to 2/3.

2. The internal series battery according to claim 1, wherein the ratio of the number of the at least one second battery unit to the total number of the battery units is 1/3 to 1/2.

3. The internal series battery according to claim 1, wherein the solid electrolyte layer of the at least one second battery unit comprises a high-safety additive;
the high-safety additive comprises at least one of phosphate ester and fluorocarbonate;
the phosphate ester comprises at least one of trimethyl phosphate and triethyl phosphate; and
the fluorocarbonate comprises at least one of methyl difluoroacetate and ethyl difluoroacetate.

4. An electrical device, comprising the internal series battery according to claim 1.

5. The internal series battery according to claim 1, wherein the at least one second battery unit comprises a plurality of second battery units in series connection.

6. The internal series battery according to claim 1, wherein the at least one second battery unit comprises a plurality of second battery units in series connection.

7. An internal series battery, comprising:
a series module, comprising battery units and intermediate current collectors; a number of the battery units being greater than or equal to 3, each of the battery units comprising a positive active material layer, a solid electrolyte layer, and a negative active material layer that are stacked; each of the intermediate current collectors being corresponding to and disposed between two adjacent battery units, and the two adjacent battery units being connected in series through the intermediate current collector;
a positive current collector, located at one end of the series module and electrically connected to the positive active material layer of the battery unit at one end of two ends of the series module opposite to each other; and
a negative current collector, located at the other end of the series module and electrically connected to the negative active material layer of the battery unit at the other end of the two ends of the series module,
wherein the battery units comprise at least two first battery units and at least one second battery unit; the at least two first battery units comprise two battery units respectively at the two ends of the series module, the at least one second battery unit is inside the series module between the two first battery units;
wherein an energy density of each first battery unit is less than an energy density of each second battery unit; each first battery unit independently comprises a sodium-ion battery positive active material, each second battery unit independently comprises a lithium-ion battery positive active material; a ratio of a number of the at least one second battery unit to a total number of the battery units is 1/3 to 2/3.

8. The internal series battery according to claim 7, wherein the ratio of the number of the at least one second battery unit to the total number of the battery units is 1/3 to 1/2.

9. The internal series battery according to claim 7, wherein the solid electrolyte layer of the at least one second battery unit comprises a high-safety additive;

the high-safety additive comprises at least one of phosphate ester and fluorocarbonate;

the phosphate ester comprises at least one of trimethyl phosphate and triethyl phosphate; and the fluorocarbonate comprises at least one of methyl difluoroacetate and ethyl difluoroacetate.

* * * * *